United States Patent
Garza et al.

(10) Patent No.: US 8,112,760 B2
(45) Date of Patent: *Feb. 7, 2012

(54) SYSTEM FOR WORKLOAD BALANCING BY RESETTING AN AVERAGE QUEUE DEPTH UPON THE START OF THE SERVER INSTANCE

(75) Inventors: Jose E. Garza, Richmond (GB); Stephen J. Hobson, Hampton (GB)

(73) Assignee: International Business Machines Corporation, Armonk, NY (US)

( * ) Notice: Subject to any disclaimer, the term of this patent is extended or adjusted under 35 U.S.C. 154(b) by 999 days.

This patent is subject to a terminal disclaimer.

(21) Appl. No.: 12/048,539

(22) Filed: Mar. 14, 2008

(65) Prior Publication Data
US 2008/0163249 A1 Jul. 3, 2008

Related U.S. Application Data

(63) Continuation of application No. 10/713,959, filed on Nov. 13, 2003, now Pat. No. 7,409,688.

(51) Int. Cl.
*G06F 9/46* (2006.01)
(52) U.S. Cl. ....................................... 718/105
(58) Field of Classification Search .................. 718/105
See application file for complete search history.

(56) References Cited

U.S. PATENT DOCUMENTS

| | | | |
|---|---|---|---|
| 5,799,173 A | 8/1998 | Gossler et al. | |
| 6,167,427 A | 12/2000 | Rabinovich et al. | |
| 6,182,109 B1 | 1/2001 | Sharma et al. | |
| 6,314,463 B1 | 11/2001 | Abbott et al. | |
| 6,314,465 B1 | 11/2001 | Paul et al. | |
| 6,466,980 B1 | 10/2002 | Lumelsky et al. | |
| 7,080,378 B1 | 7/2006 | Noland et al. | |

FOREIGN PATENT DOCUMENTS

| | | |
|---|---|---|
| EP | 0944007 A2 | 9/1999 |
| JP | 05-224903 | 9/1993 |
| JP | 10-269066 | 10/1998 |

OTHER PUBLICATIONS

"Queuing Elements", www.zvon.org/tmRFC/RFC3290/Output/chapter7.html, printed Apr. 9, 2003, pp. 1-8.
"Graphical User Interface for the Distributed Computing Environment", IBM Technical Disclosure Bulletin, vol. 38, No. 01, Jan. 1995, pp. 409-410.
Bier, Eric A., "EmbeddedButtons: Documents as User Interfaces", UIST'91, Nov. 11-13, 1991, pp. 45-53.
Floyd et al., "Random Early Detection Gateways for Congestion Avoidance", IEEE/ACM Transactions on Networking, Aug. 1993, pp. 1-32.
Goalby, John, "Scripts for Windows Scripting Host", Dr. Dobb's Journal, Jan. 1999, pp. 86-92.
Leber et al., "OpenSim: A Flexible Distributed Neural Network Simulator with Automatic Interactive Graphics", Neural Networks, 1997, vol. 10, No. 4, pp. 693-703.
Lehrbaum, Rick, "Focus on Embedded Systems: A Survey of Embedded Linux Packages", 2003, pp. 1-5.
Tilevich et al., "J-Orchestra: Automatic Java Application Partitioning", ECOOP 2002, LNCS 2374, Jun. 10-14, 2002, pp. 178-204.

*Primary Examiner* — Jennifer To
*Assistant Examiner* — Mengyao Zhe
(74) *Attorney, Agent, or Firm* — Francis Lammes; Stephen J. Walder, Jr.; David A. Mims, Jr.

(57) ABSTRACT

The present invention relates to an apparatus and computer program for workload balancing in an asynchronous messaging system. The number of server instances, which process work items from a queue of messages, is controlled based upon that queue's average queue depth and one or more predetermined thresholds.

20 Claims, 2 Drawing Sheets

SYSTEM FOR WORKLOAD BALANCING BY RESETTING AN AVERAGE QUEUE DEPTH UPON THE START OF THE SERVER INSTANCE

This application is a continuation of Ser. No. 10/713,959, now U.S. Pat. No. 7,409,688, filed Nov. 13, 2003.

FIELD OF THE INVENTION

The present invention relates to workload balancing systems and in particular to the creation and termination of server instances which process such systems' work.

BACKGROUND OF THE INVENTION

Messaging systems such as IBM(R) WebSphere(R) MQ can deliver messages to an input (application) queue of a server program. The server program is then able to remove (read destructively) such messages and action them.

It is often a requirement that instances of the server program are created dynamically, as and when needed, in order to maintain some performance objective. For example, a first instance is typically created when there is some work for the instance to do (i.e. a message has been delivered to server's application queue) and additional instances are created when the number in existence is not enough to provide a timely service.

IBM's WebSphere MQ messaging product provides a facility known as "triggering" which helps to achieve this requirement. In triggering, certain queues are monitored (those designated as "triggered") for particular transitions. These transitions are specified by users and can be, for example, a transition from queue empty to queue not empty.

When such a transition occurs, a "trigger message" is created containing details of the transition and the trigger message is put onto an initialisation queue. The initiation queue is typically specified by a user as an attribute of a triggered queue.

By reading trigger messages from initiation queues, special programs known as trigger monitors are able to decide if a new server instance is required to process messages. If a new instance is required, then one is created.

A problem with this is how to decide if a new server instance is required. Ways to do this include monitoring the extent to which existing server instances are achieving performance targets and monitoring resource utilization by existing server instances.

WebSphere MQ SupportPac™ MA0L uses ... queue depth (i.e. the number of messages on the queue) to decide when to start a new server instance. (Another example of this can be found in U.S. Pat. No. 5,799,173.) A system using this solution will however react to transient peaks rather than to actual increases in workload.

For most real-world scenarios, the number of pending service requests is subject to large short-term fluctuations. For example, one server instance might be processing messages from a queue A. If an application batches and puts 500 messages to queue A, this sudden increase in work might cause an additional 5 server instances to be created. The workload on the queue may then return to a typical rate of 10 messages on the queue at any one time. In other words, the increase in work is very short term and consequently the newly created 5 server instances are no longer necessary.

Creation and termination of server instances is costly both in terms of processing power and time. It is therefore desirable to avoid unnecessary creation of sever instances, whilst optimising the number necessary for timely processing of an application queue.

(More detail on triggering in a WebSphere MQ environment can be obtained from Websphere MQ Application Programming Guide, IBM Publication number SC34-6064.)

There are also alternatives to triggering. For example, the z/OS™ operating system (available from IBM Corporation) provides a Workload Manager (WLM) which monitors resource utilization (e.g. CPU usage)

However it has been determined that queue depth is a far more accurate method for determining when a new server instance is required. However queue depth does not take account of transient workload.

A system is desired which will react to trends in workload rather than to random (atypical) fluctuations.

SUMMARY

In a first aspect, the present invention provides an apparatus for workload balancing in an asynchronous messaging system comprising: means for obtaining the average depth of a queue of messages; and means for controlling the number of server instances retrieving messages from the queue based on the average queue depth and one or more predetermined thresholds.

Note the reference to server instance throughout the specification should be taken to encompass any application processing (retrieving) messages from a queue.

Such control is preferably achieved by starting a server instance when the average queue depth exceeds a first predetermined threshold (upper limit). Note, the apparatus itself may start a server instance. For example, the apparatus may form part of a queue manager controlling the queue of messages and the functionality to start a server instance may be built into the queue manager. Alternatively the apparatus may request that another entity (such as a trigger monitor or the server itself) start a server instance. In order to request that another entity start a server instance, a trigger message may be placed on an initialisation queue. When such a trigger message is retrieved by the other entity, it causes that entity to start the server instance. The trigger message preferably includes information regarding (i) which server to instantiate; and (ii) which queue (in a system with multiple queues) the newly instantiated server instance should retrieve messages from.

Such control preferably is also achieved by terminating (stopping) a server instance when the average queue depth falls below a second predetermined threshold (lower limit).

Note, when the first threshold has been reached and a server instance started, the average depth value is preferably reset to a value lower than the first threshold. In this way a number of server instances aren't started simply because a first server instance has taken a while to start retrieving messages and hence the average queue depth hasn't depleted.

Similarly, when it is determined that the average queue depth falls below the second threshold and a server instance is terminated, the average depth value is preferably reset to a value higher than the second threshold. In this way too many server instances aren't terminated unnecessarily.

Note control is preferably achieved via the ability to start AND stop server instances, however it is not vital that the apparatus can do both.

There are a number of ways in which termination of a server instance can be achieved. Some illustrative examples are provided:

(i) by spoofing the server instance into believing that there are no more messages on the queue for it to retrieve;
(ii) by spoofing the server instance into believing that a queue manager, controlling the queue, is shutting down;
(iii) by spoofing the server instance into believing that operator intervention has requested that the server instance shutdown; and
(iv) by (explicitly) requesting that the server instance shutdown.

According to the preferred embodiment, at least one of the above means for terminating a server instance is provided.

Note the apparatus itself may be responsible for terminating a server instance. For example, the apparatus may form part of a queue manager controlling the queue. Alternatively the apparatus may request that another entity (such as a trigger monitor or the owning server) terminate the server instance.

Such termination is preferably in response to determining that the average queue depth is below the second lower threshold.

According to a preferred embodiment, it is possible to set a maximum number of instances that can be active, at any one time. This is such that a server's resources are not unduly consumed/so that malfunctioning server instances do not cause an infinite number of server instances to be created.

According to a preferred embodiment, it is possible to set a minimum number of instances that should to be active at any one time. In this way queue throughput is assured.

In one embodiment, the apparatus calculates the queue's average depth. Alternatively the apparatus may be informed by another entity of the queue's average depth (for example, if the apparatus is not local to the queue).

By way of example, a time weighted mean average queue depth may be calculated. In another embodiment an exponentially smoothed average queue depth is calculated.

According to another aspect, the present invention provides an asynchronous messaging system for workload balancing comprising: a queue comprising messages for processing by at least one server instance; means for obtaining the average depth of the queue of messages; means for controlling the number of server instances for retrieving such messages from the queue based on the average depth of the queue and one or more predetermined thresholds.

According to another aspect, the invention provides a server instance for processing messages from a queue, the server instance comprising: means for obtaining the average depth of the queue of messages; means for controlling the number of additional server instances based on the average depth of the queue and one or more predetermined thresholds.

Preferably the server instance is able to spawn a new server instance when the average queue depth exceeds a first predetermined threshold. The server instance is preferably able to terminate an additional server instance when the average depth of the queue is below a second predetermined threshold. (The server instance preferably may even terminate itself. Further the server instance preferably may start itself based on queue depth and a predetermined threshold.)

According to another aspect, the invention provides a method for workload balancing in an asynchronous messaging system comprising: obtaining the average depth of a queue of messages; and controlling the number of server instances retrieving messages from the queue based on the average queue depth and one or more predetermined thresholds.

According to another aspect, the present invention may be implemented in software.

BRIEF DESCRIPTION OF THE DRAWINGS

A preferred embodiment of the present invention will now be described, by way of example only, and with reference to the following drawings.

DETAILED DESCRIPTION

Figure 1:
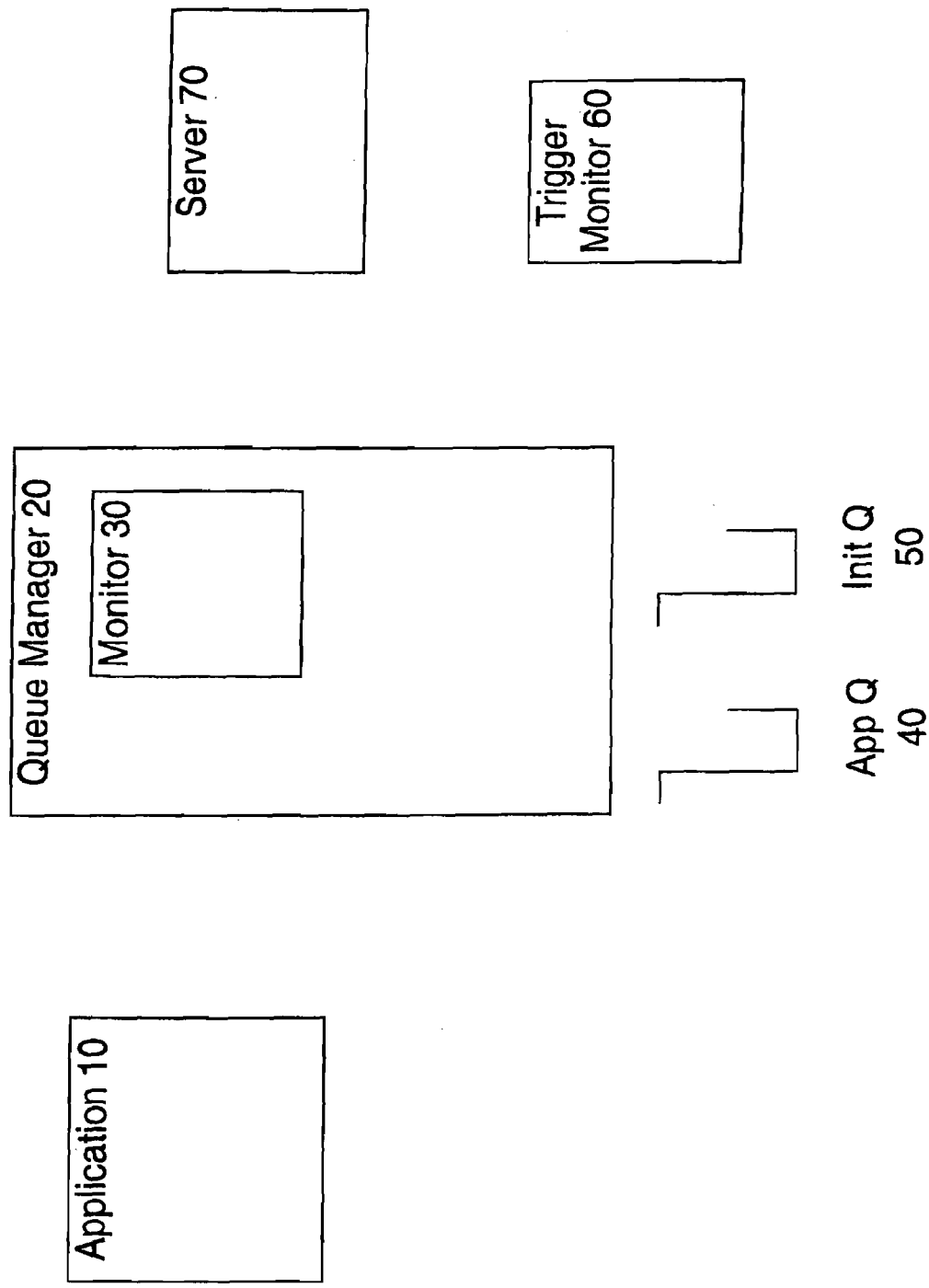
FIG. 1 illustrates components of a messaging system pertinent to a preferred embodiment of the present invention.
Figure 2:
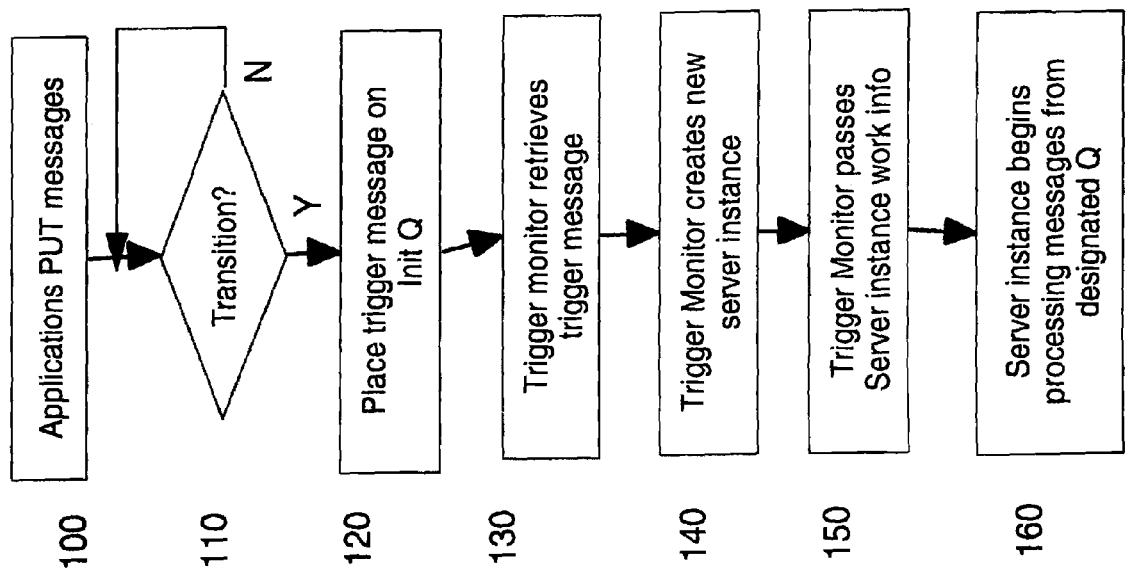
FIG. 2 is a flowchart of the processing conducted in accordance with a preferred embodiment of the present invention.

With reference to FIGS. 1 and 2, application 10 puts messages to application queue (app Q) 40 (step 100). Application queue 40 is under to control of a queue manager 20 which comprises a monitor 30 for monitoring queue 40 for certain transitions (step 110). When such a transition occurs, monitor 30 places a trigger message (not shown) onto initialisation queue (init Q) 50 (step 120). A trigger monitor 60 has a blocking GET on the initialisation queue (i.e. control will not return to the trigger monitor until it is able to retrieve a trigger message from queue 50). When such a trigger message is placed on queue 50, this is retrieved by trigger monitor 60 at step 130.

A trigger message contains information such as (i) which server to start an instance of; and (ii) which queue to start processing (retrieving) messages from. The trigger monitor uses (i) to start an instance of the appropriate server (step 140) and then passes information pertaining to (ii) to that server instance (step 150). The particular server instance is then able to begin processing messages from the relevant queue (step 160).

Prior to the present invention, typical queue transitions in an asynchronous messaging system monitored for by monitor 30 included:
i) "First"—from queue empty, to queue not empty
ii) "Depth"—from queue depth n to queue depth n+1; and
iii) "Every"—every time a new message is placed on a queue.

Dependent upon the queue depth criterion selected for a particular application queue (defined as an attribute during queue setup), the appropriate transition would cause a trigger message to be placed on the initialisation queue 50 for retrieval by trigger monitor 60. (Note, different queues may have a different transition criterion defined.)

However, as previously mentioned, the creation and termination of server instances is costly. Thus it is desirable to optimize the creation and also the termination of server instances The present invention therefore preferably addresses this by providing an additional criterion for deciding when a new server instance should be created. A similar criterion may be used to determine when a server instance should be terminated.

The present invention preferably uses the average queue depth to decide if the number of server instances should change, and if so, whether the number should increase (creation of a new server instance), or decrease (termination of an existing server instance). Average queue depth is preferably periodically evaluated and a new server instance is created when the average queue depth exceeds some "high" (upper) threshold value, and an existing server instance is terminated when the average queue depth drops below some "low" (lower) threshold value. This criterion may be defined (in the usual way) as an attribute of a queue at setup. (Note, triggering criterion may be satisfied due to fresh messages on the queue or due to a transaction backing out.)

Use of average queue depth to determine when to create a new server instance reduces the number of trigger messages placed on an initialisation queue (compared with trigger "Every").

By using such criteria, a messaging system is able to react to long-term trends rather than reacting to a random (short-term) situation fluctuation.

One very simple illustrative way of calculating the average queue depth is to measure the queue depth at one second intervals, for one hundred seconds. The one hundred queue depths measured can then be summed and the total summation divided by one hundred (time weighted mean). To continually update the average, the oldest queue depth can be discarded and a new value measured. The average can then be recalculated.

The average queue depth can then be used to determine when to trigger a new server instance. For example, it may be decided that there should never be an average greater than 4 messages on the queue at any one time. In this case, an average queue depth exceeding 4 would cause a new server instance to be created.

It should be appreciated that the use of a time weighted mean average is not the preferred solution since calculation of such an average is relatively heavy on storage.

A more preferable solution is the use of an exponentially smoothed average as a mechanism for creating new server instances/terminating server instances. In the preferred embodiment, the average queue depth is evaluated at fixed time intervals using the exponential smoothing formula:

$$A_{N+1}=(W*D_N)+((1-W)*A_N)$$

Where $A_N$ is the average queue depth over the previous x intervals at time N, $D_N$ is the instantaneous queue depth at time N and W is a weighting factor between 0 and 1. If $A_{N+1}$ is greater than $T_H$ (a predefined upper threshold limit), then a new server instance is created. If $A_{N+1}$ is less than $T_L$ (a predefined lower threshold limit), then an existing server instance is terminated (assuming that one exists).

The preferred weighting factor is $\frac{1}{16}$. The formula can then be implemented as:

$$A_{N+1}=\frac{1}{16}*D_N+\frac{15}{16}*A_N=(D_N+15*A_N)/16$$

According to a preferred embodiment, immediately after starting or stopping a server instance, the average depth $A_{N+1}$ is reset to $(T_H+T_L)/2$. It will be appreciated that this value is halfway between the low and the high thresholds. To illustrate the reason for doing this, suppose the average queue depth exceeded the upper threshold and consequently a server instance was started. There will be a short delay before the server instance starts getting messages. Thus at the next interval, the average queue depth may still be high and thus another instance may be started needlessly. If the system had waited a short time for the new server instance to start getting messages, the average would have gone down. Resetting the average gives time for the new server instance to start getting messages. The same applies to stopping instances. Without resetting the average, too may instances may be stopped, only for the system to have to start them again shortly afterwards. Note, whilst the halfway value is preferred any value between the upper and lower threshold should work.

Parameters such as how often to measure queue depth and also how many samples to measure are preferably not user configurable. Tests will preferably have been conducted to decide what values should be fixed. The values chosen will determine how quickly the system reacts to a change in queue depth. For example, 1 million samples will mean that an instantaneous change in queue depth (perhaps due to a batch of 500 messages being placed on the queue) will make little difference. Further, sampling too often will waste processing power and will mean that the system will react too quickly to transient peaks in workload. On the other hand, sampling too infrequently will mean that the system typically reacts too slowly for the majority of users. Thus the fixing of appropriate values is a fine balance.

It is believed by the inventors that sampling queue depth every 0.2 seconds and also the use of 16 samples to calculate the average is a good metric. (Computers are particularly fast at dividing by sixteen (or any other power of 2))

Note, it has been determined by the inventors that the once appropriate values have been fixed, changes in workload should make little difference as to the ability of the system in processing messages efficiently. In other words the number of server instances created/terminated using such a mechanism should be appropriate for the majority of workloads.

In order to terminate a server instances, a number of solutions are possible:
1) One way is to "lie" to a server instance. A server instance will typically attach to an application queue in order to retrieve a message therefrom. The server instance will typically abort after a predetermined period of time (e.g. 10 seconds) if it sees no messages on the application queue after that time has elapsed. The queue manager, in one embodiment, lies to a server instance and informs it that there are no messages to process on the application queue. In this way, the server instance is shut down;
2) Another solution is to provide a return code to the server instance informing it (erroneously) that the queue manager is shutting down. This will also cause the server instance to shutdown.
3) Another solution is to (erroneously) inform the server instance that the operator has asked that it shutdown; and
4) An alternative solution is for the queue manager to incorporate a specific shutdown function which it could call when a lower threshold is reached.

It will be appreciated that the above are only examples of the way in which termination of server instances could be achieved. These solutions are particularly advantageous however since they do not require any modification at the server-end.

In one embodiment, a server instance is created/terminated by the trigger monitor 60. (Note, the invention preferably does not require any modification to the trigger monitor. This is particularly useful since these are typically customer-written)

In order to create/terminate a server instance, the entity doing the creation/termination has to understand how to initiate the creation/termination. As previously alluded to, trigger monitors are typically written by customers. They are typically written in such a way as to be able to start those customers' servers. A trigger monitor written by a customer to start an instance of that customer's server A, should understand what is necessary in order to achieve the desired act. Thus use of the trigger monitor to create/terminate a server instance is the simplest solution.

However it would also be possible for the queue manager itself (e.g. monitor 30) to create/terminate server instances. This solution is more difficult to program since for it to be effective, the queue manager requires the intelligence to start and stop instances of servers written by a number of different customers. One advantage of this solution however is that a trigger monitor will no longer be necessary.

According to the preferred embodiment, there is preferably also a maximum number of server instances that may be started. Different maximums may be applied to different servers and their instances and may be dynamically configurable by users.

Use of a maximum may be useful for a number of reasons:
1) A server may have limited resources; and/or
2) A trigger monitor may be creating instances of a server and those instances may be malfunctioning.

Without a maximum, more and more malfunctioning server instances could be created which would unnecessarily consume resources.

According to the preferred embodiment, there is also a minimum number of server instances. This is because starting up a server instance is a timely business. Thus it is desirable that there are always enough server instances to keep the queue moving (maybe at least one server instance).

Three exemplary ways of implementing this are:
1) Start the minimum number of server instances when the queuing system starts;
2) Start the minimum number of server instances when the first message arrives to the application queue; or
3) Let the number of server instances increase as the workload increases, but when the workload decreases do not drop below the specified minimum.

U.S. Pat. No. 5,799,173 uses a parameter to decide between options 1 and 2. In a preferred embodiment option 1 is chosen because most users who specify a minimum number of servers do so because they cannot tolerate the delay in starting new servers.

In the preferred embodiment, the queue manager abstains from putting another trigger message onto the initiation queue if the number of server instances reaches a defined maximum. It also abstains from terminating a server instance if that meant the number of server instances would drop below a defined minimum. This has the advantage that the trigger monitor remains unmodified and continues to receive its instructions from the init Q.

It will be appreciated that whilst the present invention has been described in terms of triggering (via a trigger monitor and trigger messages), no such limitation is intended. The invention is preferably applicable to any workload balancing asynchronous messaging system needing to determine when to create a new server instance for processing of work/when to terminate a server instance.

Rather than use a trigger monitor to create/terminate a server instance alternative solutions are possible. For example:
i) The queue manager may create/terminate server instances (see earlier)—in which case no trigger monitor is necessary.
ii) The functionality may be built into a workload manager such as that provided by WLM.
iii) The functionality may be built into the servers themselves such that the server creates instances of itself based on average queue depth.

Regarding ii) and iii), information regarding average queue depth may be passed to WLM/server from the queue manager.

The term queue depth has been used herein to mean the number of messages on the queue.

To summarise, the present invention relates to an apparatus, method and computer program for workload balancing in an asynchronous messaging system. The number of server instances, which retrieve messages from a queue of messages, is controlled based upon that queue's average queue depth rather than the queue's instantaneous queue depth. In this way it is possible for a system making use of the present invention to react to trends in workload, rather than reacting to random (atypical) workloads.

What is claimed is:

1. An apparatus, having a processor, for workload balancing in an asynchronous messaging system comprising:
   means for obtaining an average queue depth of a message queue;
   means for controlling a number of server instances of a server for retrieving messages from the message queue based on the average queue depth and one or more predetermined thresholds;
   means for determining if the average queue depth exceeds a first predetermined threshold of the one or more predetermined thresholds;
   means for initiating the start of a server instance for retrieving messages from the message queue by placing a trigger message on an initialisation queue in response to determining that the average queue depth exceeds the first predetermined threshold of the one or more predetermined thresholds, wherein the trigger message indicates that the server instance is to be started; and
   means for resetting the average queue depth to less than the first predetermined threshold immediately upon the start of the server instance in response to determining that the first predetermined threshold has been exceeded.

2. The apparatus of claim 1, wherein the means for controlling the number of server instances comprises:
   means for terminating the server instance when the average queue depth falls below a second predetermined threshold of the one or more predetermined thresholds.

3. The apparatus of claim 2, comprising:
   means, responsive to determining that the average queue depth is below the second predetermined threshold, for resetting the average queue depth to greater than the second predetermined threshold immediately upon the termination of the server instance.

4. The apparatus of claim 2, wherein the means for terminating the server instance comprises at least one of:
   (i) means for indicating to the server instance that there are no more messages to process on the message queue;
   (ii) means for indicating to the server instance that a queue manager, controlling the message queue, is shutting down;
   (iii) means for indicating to the server instance that operator intervention is requesting that the server instance shut down; or
   (iv) means for requesting that the server instance shut down.

5. The apparatus of claim 1, comprising:
   means for setting a maximum number of server instances that can be active at any one time; or
   means for setting a minimum number of server instances that should be active at any one time.

6. The apparatus of claim 1 wherein the means for obtaining the average queue depth comprises:
   means for calculating the average queue depth of the message queue.

7. The apparatus of claim 6 wherein the means for calculating comprises:
   means for calculating a time weighted mean average queue depth of the message queue.

8. The apparatus of claim 6, wherein the means for calculating comprises:
   means for calculating an exponentially smoothed average queue depth of the message queue.

9. A computer program for workload balancing in an asynchronous messaging system, the computer program stored on a computer recordable medium having computer readable program code, wherein the computer readable program code, when executed in a data processing system, causes the data processing system to:

obtain an average depth of a message queue;

control a number of server instances of a server for retrieving messages from the message queue based on the average queue depth and one or more predetermined thresholds;

determine if the average queue depth exceeds a first predetermined threshold of the one or more predetermined thresholds;

responsive to determining that the average queue depth exceeds the first predetermined threshold, initiate the start of a server instance for retrieving messages from the message queue by placing a trigger message on an initialisation queue, wherein the trigger message indicates that the server instance is to be started; and responsive to determining that the first predetermined threshold has been exceeded, reset the average queue depth to less than the first predetermined threshold immediately upon the start of the server instance.

10. The computer program of claim 9, wherein the computer readable program code to control the number of server instances further includes computer readable program code that causes the data processing system to:

terminate the server instance when the average queue depth falls below a second predetermined threshold of the one or more predetermined thresholds.

11. The computer program of claim 10, wherein the computer readable program code further causes the data processing system to:

responsive to determining that the average queue depth is below the second predetermined threshold, reset the average queue depth to greater than the second predetermined threshold immediately upon the termination of the server instance.

12. The computer program of claim 10, wherein the computer readable program code to terminate the server instance further includes computer readable program code that causes the data processing system to perform at least one of:

(i) indicating to the server instance that there are no more messages to process on the message queue;

(ii) indicating to the server instance that a queue manager, controlling the message queue, is shutting down;

(iii) indicating to the server instance that operator intervention is requesting that the server instance shut down; or (iv) requesting that the server instance shut down.

13. The computer program of claim 9, wherein the computer readable program code further causes the data processing system to perform at least one of:

setting a maximum number of server instances that can be active at any one time; or setting a minimum number of server instances that should be active at any one time.

14. The computer program of claim 9, wherein the computer readable program code to obtain the average queue depth further includes computer readable program code that causes the data processing system to:

calculate the average queue depth of the message queue.

15. A system, comprising:

a processor; and a memory coupled to the processor, wherein the memory comprises instructions which, when executed by the processor, cause the processor to:

obtain an average depth of a message queue;

control a number of server instances of a server for retrieving messages from the message queue based on the average queue depth and one or more predetermined thresholds;

determine if the average queue depth exceeds a first predetermined threshold of the one or more predetermined thresholds;

responsive to determining that the average queue depth exceeds the first predetermined threshold, initiate the start of a server instance for retrieving messages from the message queue by placing a trigger message on an initialisation queue, wherein the trigger message indicates that the server instance is to be started; and responsive to determining that the first predetermined threshold has been exceeded, reset the average queue depth to less than the first predetermined threshold immediately upon the start of the server instance.

16. The system of claim 15, wherein instructions for controlling the number of server instances further cause the processor to:

terminate the server instance when the average queue depth falls below a second predetermined threshold of the one or more predetermined thresholds.

17. The system of claim 16, wherein the instructions further cause the processor to:

responsive to determining that the average queue depth is below the second predetermined threshold, reset the average queue depth to greater than the second predetermined threshold immediately upon the termination of the server instance.

18. The system of claim 16, wherein the instructions for terminating the server instance further cause the processor to perform at least one of:

(i) indicating to the server instance that there are no more messages to process on the message queue;

(ii) indicating to the server instance that a queue manager, controlling the message queue, is shutting down;

(iii) indicating to the server instance that operator intervention is requesting that the server instance shut down; or (iv) requesting that the server instance shut down.

19. The system of claim 15, wherein the instructions further cause the processor to perform at least one of:

set a maximum number of server instances that can be active at any one time; or set a minimum number of server instances that should be active at any one time.

20. The system of claim 15, wherein the instructions for obtaining the average queue depth further cause the processor to:

calculate the average queue depth of the message queue.

* * * * *